April 25, 1933.    A. J. KERCHER    1,905,233
THERMOSTAT
Original Filed July 29, 1930
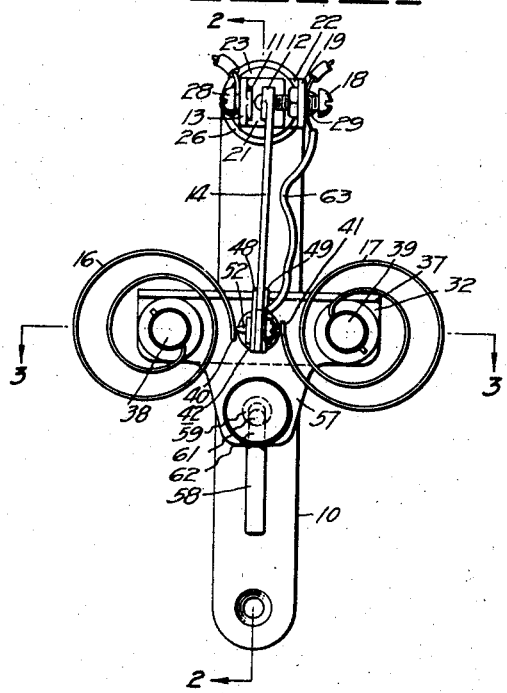
FIG_1_
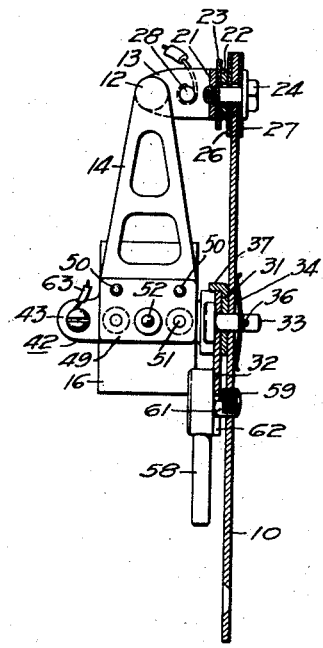
FIG_2_
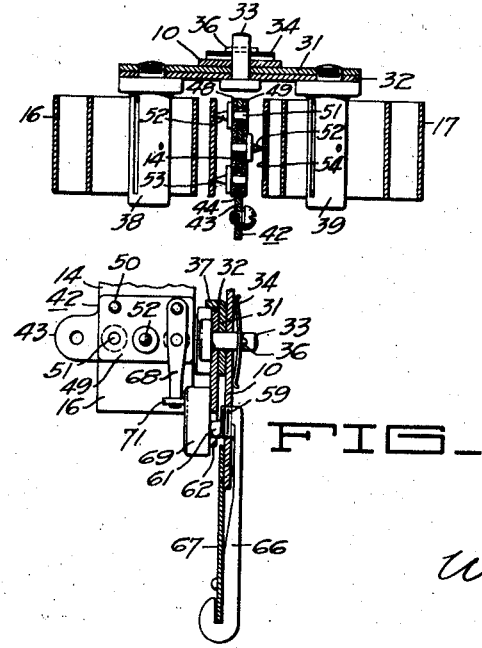
FIG_3_
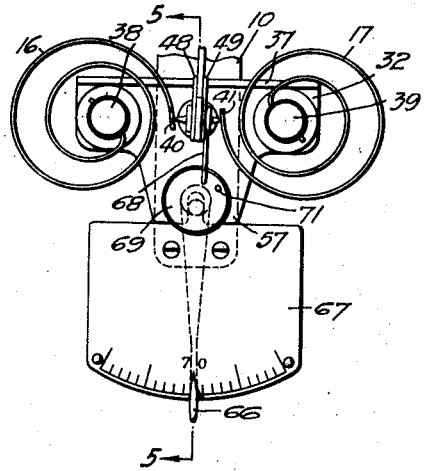
FIG_4_
FIG_5_
INVENTOR.
Arthur J. Kercher
BY
White, Prost, Fehr & Lothrop
ATTORNEYS.

Patented Apr. 25, 1933

1,905,233

UNITED STATES PATENT OFFICE

ARTHUR J. KERCHER, OF BERKELEY, CALIFORNIA

THERMOSTAT

Application filed July 29, 1930, Serial No. 471,503. Renewed August 15, 1932.

This invention relates generally to thermostats for effecting a control in accordance with temperature changes of a given medium. It has particular application to devices of this character for controlling one or more electrical circuits, in accordance with the temperature of water, air or other medium.

In thermostats of the above character it has been common to utilize a suitable temperature responsive element, as for example a bimetallic strip which will flex in accordance with temperature changes, connected to a movable electrical contact in such a manner as to move the contact to either closed or open position with respect to a cooperating stationary contact. One of the chief defects of prior devices of this character has been a lack of positive action to the movement of the electrical contact, which necessarily results in arcing between the contacts and in improper control of the associated electrical circuit. This lack of positive action generally manifests itself by a chattering of the contacts, and is most noticeable when the temperature change which should effect operation of the contacts are relatively small. Attempts to secure more positive action by the use of toggle means have been only partially successful, and have generally been at the sacrifice of sensitivity.

It is a general object of the present invention to devise a thermostat which will be characterized by the positive action of its contacts and which will also be relatively sensitive in its action. As will be presently explained this object is attained in the present invention by the use of a plurality of temperature responsive elements which are arranged to act additively thru a toggle bridge.

It is a further object of the invention to devise a thermostat of relatively simple and rugged construction and which can be readily adjusted to effect control over a substantially wide temperature range.

Further objects of the invention will appear from the following description in which the preferred embodiments of the invention have been set forth in detail. It is to be understood that the appended claims are to be accorded a range of equivalents consistent with the state of the prior art.

Referring to the drawing:

Figure 1 is a plan view illustrating a thermostat constructed in accordance with the present invention.

Fig. 2 is a cross sectional view taken along the line 2—2 of Fig. 1.

Fig. 3 is a cross sectional view taken along the line 3—3 of Fig. 1.

Fig. 4 is a detail in plan illustrating a modification of the thermostat shown in Fig. 1.

Fig. 5 is a cross sectional detail taken along the line 5—5 of Fig. 4.

Referring first to that form of the invention shown in Figs. 1 to 3 inclusive, the device consists of a suitable mounting 10, which can conveniently be in the form of a relatively rigid metal bar or strip. As the device in this instance is adapted for the control of one or more electrical circuits, I have shown a pair of cooperating contacts 11 and 12. Stationary contact 11 is carried by suitable means such as an upstanding member 13. Movable contact 12 is carried by one end of a lever arm 14, which in turn is connected to temperature responsive elements 16 and 17 to be presently described.

For limiting movement of contact 12 to open position and adjustable stop in the form of a set screw 18 is provided, this set screw being carried by an upstanding member 19. For fixing members 13 and 19 to mounting 10, they are each shown provided with superposed laterally bent portions 21 and 22, which are retained out of direct electrical contact with each other by means of insulating disc 23. A screw 24 extends thru an opening in one end of mounting 10, thru another opening in portion 22, and is threaded into member 21. An insulating washer 26 prevents direct electrical connection between portion 22 and mounting 10, while another insulating washer 27 prevents direct electrical connection between screw 24 and the mounting. A terminal connector 28 facilitates the making of electrical connection with stationary contact 11, and another terminal connector 29 is provided for making electrical connection with movable contact 12.

Temperature responsive elements 16 and 17 are preferably in the form of bimetallic strips which tend to flex in response to temperature changes. Bimetallic strips of this character are well known in the art and are formed of two connected layers of metals having different temperature coefficients of expansion. In order to make the completed thermostat as compact as possible, these strips are preferably formed spirally as shown. For connecting these strips to the mounting I have shown a pair of superposed plates 31 and 32 which are pivotally connected to mounting 10 by means of pivot pin 33. Pin 33 is normally retained in place by means of a leaf spring 34 which engages the under side of mounting 10 and an abutment pin 36 inserted thru pin 33. An upturned flange 37 on plate 31 tends to add rigidity to the mounting for strips 16 and 17. The inner ends of strips 16 and 17 are fixed within slots provided in studs 38 and 39, and these studs are in turn mounted at spaced points upon plates 31 and 32.

The outer end portions 40 and 41 of strips 16 and 17 are arranged so as to be in spaced proximity. The bimetallic layers of these elements are also preferably arranged so that each strip tends to uncoil in response to an increase in temperature, and since the elements are coiled in opposite directions, end portions 40 and 41 move in opposite directions responsive to like changes in temperature.

Interposed between the end portions 40 and 41 there is a toggle bridge 42, which in turn is connected to lever arm 14. The construction of this toggle bridge 42 can be made clear by reference to Fig. 3. The adjacent end of lever arm 14 is provided with a portion 43 of enlarged width. This portion is provided with alined apertures 44. Strips 48 and 49 of suitable insulating material, such as mica, are arranged upon opposite sides of portion 43. The strips can be held in proper position by means of rivets 50. Studs 51 project thru insulating strips 48 and 49 are alined with apertures 44, and each stud is provided with a projecting pivot point 52. The two pivot points 52 upon one side of the bridge engage indentations 53 in the adjacent end portion 40 of element 16, while the pivot point 52 upon the other side of the bridge engages a groove 54 formed in the end portion 41 of element 17. When the toggle bridge 42 is positioned between end portions 40 and 41 these end portions are sprung apart to a substantial degree, so that pivot pins 52 are always urged inwardly to retain them in proper assembled relationship.

In combination with the elements described above I also utilize means for adjusting the device for effecting a control at any point over a substantial range of temperatures. In this instance this is accomplished by means for adjusting the angular position of plates 31 and 32 with respect to mounting 10. Thus plate 32 is shown provided with a projecting portion 57. A hand controlled lever 58 is pivotally connected to mounting 10 by means of threaded stud 59. Stud 59 is provided with an excentric portion 61, which fits within a slot 62 provided in portion 57. Therefore by changing the angular setting of lever 58, the angular position of plates 31 and 32 can be adjusted between certain limits. It should be noted however that a change in the angular position of plates 31 and 32 with respect to mounting 10, is about the center of pivot pin 33, which intersects the line of centers between pivot pins 52 as viewed in Fig. 1.

In utilizing my device electrical connections to contacts 11 and 12 are made by connecting the circuit wires to binding posts 28 and 29. Binding post 29 is shown connected to lever 14, and thus to contact 12, by means of flexible lead 63.

When the device is in operation toggle bridge 42 is subjected to turning torque to rotate the same in one or the other direction depending upon the temperature of strips 16 and 17 and upon setting of lever 58. The turning torque is of course effected by virtue of the tendency of end portions 40 and 41 to move in opposite directions in response to like changes of temperature in strips 16 and 17. The toggle effect which makes positive movement of the contact 12, is produced by virtue of the normal sprung condition of the strips 16 and 17, whereby end portions 40 and 41 are always normally biased together upon the pivot pins 52. Of course for a given setting of lever 58, a certain temperature variation is required to effect movement of contact 12 from open to closed position or vice versa. Assuming now for a given adjustment of the device, the temperature of elements 16 and 17 is midway between such upper and lower limits, contact 12 will remain in either open or closed condition. Furthermore for such condition the toggle bridge will move thru a dead center position when the contacts are opened or closed. Therefore as the temperature varies between such limits, contact 12 is caused to move rapidly from either closed to open position, and the rapidity of movement is caused by upsetting the toggle formed by bridge 42. It is evident that if for one setting of lever 58 the contacts will close at a given temperature, resetting of this lever to change the angular position of plates 31 and 32 with respect to mounting and to the toggle bridge, will have the effect of requiring a different temperature of the strips 16 and 17 to close the contacts Thus by varying the setting of lever 58 the contacts can be caused to close for any desired temperature over a substantial temperature range.

As explained above the positive movement of the contact is caused in part by the toggle action of bridge 42. It is also caused in part by the fact that movements of the end portions 40 and 41 act additively upon the toggle bridge. This additive action renders the device sensitive, and also enables the use of relatively rugged bimetallic strips which are capable of exerting a relatively high turning torque.

In the modification shown in Figs. 4 and 5 I have incorporated means for mechanically retaining the contacts in open position when the control lever is moved to a limiting position. Thus in this case the adjusting lever 66 is secured to threaded stud 59. A graduated plate 67 is secured to mounting 10, whereby the setting of lever 66 can be visually determined. Mounted upon arms 14 and extending beyond pivot pin 52, there is an arm or tongue 68. The head 69 on stud 59 carries a projecting pin 71, adapted to engage one side of tongue 68. As viewed in Fig. 4, when lever 66 is moved to the right to its limiting position, pin 71 engages tongue 68, and thereby positively retains contacts 11 and 12 in open position. Thus the device is rendered inoperative to effect closing of the contacts for any temperature variations, until lever 66 is manually moved from its limiting position.

I claim:

1. In an electrical control thermostat, a stationary contact, a movable contact movable between open and closed positions with respect to the stationary contact, a pair of bimetallic strips, a mounting to which an end of each strip is fixed, pivot pins serving as a connection between the free ends of the strips, said strips being normally tensioned to urge the free ends of said strips together, a member connecting said pivot pins with the movable contact, said strips being arranged to flex oppositely responsive to like temperature changes, and means for adjustably rocking said mounting about an axis intersecting the center line of said pivot pins, whereby both of said bimetallic strips and the movable contact carrying member can be conditioned to effect closure of the contacts at a different temperature.

2. In an electrical control thermostat, a stationary contact, a movable contact movable between open and closed positions with respect to the stationary contact, a pair of bimetallic strips, a mounting to which an end of each strip is fixed, the free ends of said strips being in opposed spaced proximity, a bridge member interposed between said free ends and having points of pivotal connection with the same, said strips being normally tensioned to press toward the points of pivotal connection whereby the bridge tends to rotate in either direction past dead center position, a member connecting said bridge and said movable contact, said strips being arranged to flex oppositely responsive to like temperature changes, means for adjustably rocking said mounting about an axis passing through the center of said bridge member, whereby both of said bimetallic strips and said movable contacts can be conditioned to effect closure of said contacts at any desired temperature within the range of adjustability, said adjusting means being under the control of a single hand actuated lever, and a restraining member made operative upon movement of said lever to one of its extreme positions for precluding closure of said contacts in response to temperature changes.

3. In an electrical contacting device, a stationary contact, a cooperating contact movable between open and closed positions relative to the stationary contact, a pair of oppositely spiraled resilient strips, mounting means to which an end of each strip is fixed, a toggle bridge pivotally connected to the free end of said strips, said strips being normally tensioned to urge the free ends thereof together, a lever arm connecting said toggle bridge to said movable contacts, and means for shifting the position of the mounting means for the inner ends of said strips with respect to said stationary contact.

4. In an electrical contacting device, a stationary contact, a cooperating contact movable between open and closed positions with respect to the stationary contact, a pair of oppositely spiraled resilient strips made of bimetallic metal, mounting means to which an inner end of each strip is fixed, a toggle bridge pivotally connected to the free ends of said strips, said strips being normally tensioned to urge the free ends thereof together, a lever arm connecting said toggle bridge to said movable contact, and means for shifting the position of the mounting means for the inner ends of said strips with respect to said stationary contact, said strips being arranged to flex oppositely responsive to like changes in temperature.

5. In an electrical contacting device, a toggle bridge, a lever arm having one end thereof mounted upon said toggle bridge, a contact carried by the free end of said arm, a stationary contact adapted to cooperate with said movable contact, a support to which said stationary contact is secured, a structure pivotally secured to said support adjacent said toggle bridge, means forming a pivotal connection between said structure and one side of said toggle bridge, and resilient means forming a pivotal connection between the other side of said toggle bridge and said structure, said last means serving to apply resilient force to said toggle bridge, the components of which cause rapid opening and closing of said contacts thru rotation of the toggle bridge.

In testimony whereof, I have hereunto set my hand.

ARTHUR J. KERCHER.